US008434723B2

(12) United States Patent
Simpson et al.

(10) Patent No.: US 8,434,723 B2
(45) Date of Patent: May 7, 2013

(54) LOW DRAG ASYMMETRIC TETRAHEDRAL VORTEX GENERATORS

(75) Inventors: Roger L. Simpson, Blacksburg, VA (US); K. Todd Lowe, Blacksburg, VA (US); Quinn Q. Tian, Blacksburg, VA (US)

(73) Assignee: Applied University Research, Inc., Blacksburg, VA (US)

( * ) Notice: Subject to any disclaimer, the term of this patent is extended or adjusted under 35 U.S.C. 154(b) by 146 days.

(21) Appl. No.: 13/116,131

(22) Filed: May 26, 2011

(65) Prior Publication Data

US 2011/0315248 A1 Dec. 29, 2011

Related U.S. Application Data

(60) Provisional application No. 61/350,140, filed on Jun. 1, 2010.

(51) Int. Cl.

| | |
|---|---|
| ***B64C 21/00*** | (2006.01) |
| ***B64C 1/38*** | (2006.01) |
| *B01F 5/00* | (2006.01) |
| *E02D 31/02* | (2006.01) |

(52) U.S. Cl.
USPC ........ 244/204; 244/198; 244/200.1; 244/130; 366/337; 405/211

(58) Field of Classification Search .................. 244/1 N, 244/130, 199.1, 199.2, 198, 200, 200.1, 204; 366/337; 405/211
See application file for complete search history.

(56) References Cited

U.S. PATENT DOCUMENTS

| | | | | |
|---|---|---|---|---|
| 3,578,264 | A * | 5/1971 | Kuethe | 244/200.1 |
| 4,354,648 | A * | 10/1982 | Schenk et al. | 244/200.1 |
| 5,433,596 | A * | 7/1995 | Dobbeling et al. | 431/350 |
| 5,598,990 | A * | 2/1997 | Farokhi et al. | 244/200.1 |
| 5,803,602 | A * | 9/1998 | Eroglu et al. | 366/337 |
| 7,983,045 | B2 * | 7/2011 | Bhattacharya et al. | 361/707 |
| 2004/0037162 | A1 * | 2/2004 | Flohr et al. | 366/181.5 |
| 2005/0006063 | A1 * | 1/2005 | Zhang | 165/109.1 |
| 2010/0132921 | A1 * | 6/2010 | Moskal et al. | 165/104.19 |
| 2010/0301173 | A1 * | 12/2010 | Wood | 244/200 |

(Continued)

OTHER PUBLICATIONS

Ashill et al., "A Review of Recent Developments in Flow Control", The Aeronautical Journal, May 2005, pp. 205-232, Paper No. 2977.

(Continued)

*Primary Examiner* — Philip J Bonzell
*Assistant Examiner* — Marc Burgess
(74) *Attorney, Agent, or Firm* — Berenato & White, LLC

(57) ABSTRACT

An asymmetric tetrahedral vortex generator that provides for control of three-dimensional flow separation over an underlying surface by bringing high momentum outer region flow to the wall of the structure using the generated vortex. The energized near-wall flow remains attached to the structure surface significantly further downstream. The device produces a swirling flow with one stream-wise rotation direction which migrates span-wise. When optimized, the device produces very low base drag on structures by keeping flow attached on the leeside surface thereof. This device can: on hydraulic structures, prevent local scour, deflect debris, and reduce drag; improve heat transfer between a flow and an adjacent surface, i.e., heat exchanger or an air conditioner; reduce drag, flow separation, and associated acoustic noise on airfoils, hydrofoils, cars, boats, submarines, rotors, etc. during subsonic or supersonic conditions; and, reduce radar signatures by using faceted edges with angles amenable to stealth technologies.

6 Claims, 12 Drawing Sheets

U.S. PATENT DOCUMENTS

| | | | | |
|---|---|---|---|---|
| 2011/0095135 | A1* | 4/2011 | Miller et al. | 244/200.1 |
| 2011/0229321 | A1* | 9/2011 | Kilaras | 416/1 |
| 2012/0134753 | A1* | 5/2012 | Simpson et al. | 405/211 |

OTHER PUBLICATIONS

Lin, "Review of research on low-profile vortex generators to control boundary-layer separation", Progress in Aerospace Sciences , 2002, pp. 389-420, vol, 38.

Simpson,"Turbulent Boundary Layer Separation", Annual Review of Fluid Mechanics, 1989, pp. 205-207, 231-234, vol. 21.

Simpson, "Aspects of Turbulent Boundary Layer Separation", Progress in Aerospace Sciences, 1996, pp. 457-521, vol. 32.

Simpson, "Junction Flows," Annual Reviews of Fluid Mechanics, 2001, pp. 415-443, vol. 33.

Tian et al., "Flow visualization on the linear compressor cascade endwall . . . ", Measurement Science and Technology, Aug. 2004, pp. 1910-1916, vol. 15, No. 9.

* cited by examiner

LOW DRAG ASYMMETRIC TETRAHEDRAL VORTEX GENERATORS

This application claims the benefit of U.S. Provisional Application Ser. No. 61/350,140, filed Jun. 1, 2010.

FIELD OF THE INVENTION

The invention generally relates to the fields of aerodynamics, hydrodynamics, fluid mechanics, heat transfer, and hydraulic engineering. More particularly, the low drag asymmetric tetrahedral vortex generator invention is a manufactured device for placement in a fluid or hydraulic flow that is capable of drag reduction, flow separation control, increased heat exchange, bridge pier and abutment scour prevention, and prevention of debris collection around bridge piers and abutments.

BACKGROUND OF THE INVENTION

In fluid mechanics, a boundary layer is developed by viscous effects in the region immediately adjacent to a bounding surface and it also causes the surface friction which is related to the drag. Boundary layer separation occurs under adverse or positive pressure gradients when the portion of the boundary layer closest to the wall departs from the surface (Simpson, 1989, 1996). This breakdown of the boundary-layer flow is exhibited as a thicker more turbulent region of low wall shear stress that produces a significant modification of the pressure field from the attached boundary layer condition and mean or time-averaged flow reversal in some instances. Therefore, boundary layer separation results in a large increase in the pressure drag on the body, which is most of the total drag, and an increase in related acoustic noise (Simpson, 1989; Lin, 2002).

In hydraulic engineering, a scoured bed around the hydraulic structure is most often a consequence of separation of the incoming boundary layer as it encounters the hydraulic structure and the resulting vortical flow. The scour of sediment around the base of a hydraulic structure is a major cause of catastrophic bridge collapse. Therefore, flow separation control techniques around the hydraulic structure can be effective to prevent flows that cause scour.

The majority of the heat transfer to and from a body also takes place within the heat exchanging fluid boundary layer. The low momentum region developed next to the flow separation results in very poor heat exchange performance between the body surface and the flow. Therefore, suppressing the boundary layer separation increases the rate of heat exchange between a body surface and a heat exchanging fluid.

There are a number of passive and active ways to control boundary layer separation, such as vortex generators, boundary layer trips (turbulators), suction and ejection devices, etc. In the discussion to follow, the method of separation control via vortex generators is described in terms of the current state-of-the-art.

REVIEW OF PRIOR-ART

Hydraulic Applications: Debris Deflection and Local Scour Countermeasures

In U.S. Pat. No. 5,839,853 (Oppenheimer and Saunders), one set of vortex generators, located upstream of the hydraulic structure, is specified to produce a pair of stream-wise vortices that move toward the free surface and protect the hydraulic structure from the impact of oncoming debris. Another set of vortex generators is positioned directly in front of the hydraulic structure to prevent the streambed from scouring by counteracting the horseshoe vortex (also sometimes called the necklace vortex) that would be formed by separation at the hydraulic structure nose if there was no control. The invention in U.S. Pat. No. 6,186,445 by Batcho applied a similar counteracting method for the horseshoe vortex as in the U.S. Pat. No. 5,839,853 (Oppenheimer and Saunders) with other kinds of vortex generator apparati. Batcho also expanded the application fields and he stated that the invention can be used to suppress the horseshoe vortex around bridge piers and those occurring on aircraft, submarines, and buildings. Therefore, it can be applied to reduce scour around bridge piers and abutments and flow generated acoustic noise on submarines and aircraft. However, the Annual Reviews paper by Simpson (2001) showed that this counteracting mechanism fails as a countermeasure.

Drag Reduction and Separation Control

In FIG. 1, the triangular ramp-type vortex generators in U.S. Pat. No. 2,800,291 invented by Stephens were designed to delay or prevent flow separation by energizing the boundary layer through a pair of induced vortices. Similar to triangular ramp-type vortex generators, "V"-shaped vortex generators as shown in FIG. 2 in U.S. Pat. Nos. 3,578,264 and 3,741,285 by Kuethe were employed to create vortices to transfer energy from the outer region boundary layer flow into the low momentum near wall flow to suppress flow separation. This wishbone like vortex generator is positioned on a flow control surface with the apex facing upstream. A similar "V" shaped vortex generator patent (U.S. Pat. No. 5,058,837) was granted to Wheeler and his design has different cross-sectional shapes with the apex facing downstream. A channel/groove type vortex generator in FIG. 3 was also invented by Wheeler in U.S. Pat. No. 4,455,045. However, its complex geometry made it laborious to manufacture and costly to machine. The U.S. Pat. No. 4,655,419 by van der Hoeven described a vane type vortex generator device to generate vortices at a selected location on a flow control surface, such as an aircraft wing. Another prior art patent (Farokhi and Taghavi, U.S. Pat. No. 5,598,990) described triangular cavity type vortex generators as shown in FIG. 4 for controlling supersonic flow separation and reducing drag. The triangular cavity type vortex generators are constructed by revolving cuts of triangular cross section around the vertical triangular edge normal to the incoming flow. Two counter-rotating vortices are created along the vertical side edges to energize the boundary layer flow. The invention by Krastel in U.S. Pat. No. 6,276,636 disclosed tab-shaped or vane type vortex generators as shown in FIG. 5 to reduce the surface friction on a motor vehicle. This tab-shaped vortex generator can be any kind of protraction on the body of the moving object. Others have contributed technical data on these prior-art inventions (Ashill, 2005; Joslin and Miller, 2009; Lin, 2002) and discuss applications to supersonic flow.

Heat Exchange

The invention by Min-Sheng Liu et al. in U.S. Pat. No. 6,929,058 disclosed a cold plate with an arrangement of pairs of tab-shaped vortex generators which generate counter-rotating vortices. The vortices increased the mixing rate and improved the heat transfer on the cold plate without causing much pressure drop in the heat exchanger. The inventions in U.S. Pat. No. 6,578,627 by Min-Sheng Liu et al. and U.S. Pat. No. 7,337,831 by Torii are related to improving the heat transfer around a tubular heat transfer device. More specifically, different shaped vortex generators with various patterns are specified for controlling the separation of heat carrying fluid.

SUMMARY OF THE INVENTION

This invention is a low drag asymmetric tetrahedral vortex generator for preventing local scour, deflecting debris that could degrade the performance of the vortex generator, and reducing drag around the hydraulic structures, such as bridge piers and abutments and coastal wind turbines; improving heat transfer between a flow and an adjacent surface as inside a heat exchanger or air conditioner; reducing drag and suppressing flow separation and associated separation related acoustic noise at subsonic and supersonic conditions on airfoils, hydrofoils, cars, boats, submarines, rotors, flow ducting, etc. The asymmetric tetrahedral vortex generator disclosed herein controls three-dimensional flow separation by bringing high momentum outer region flow to the wall by induction from the vortex generated by the vortex generator so that the energized near-wall flow remains attached to the body surface significantly further downstream than without the device. The present invention produces a swirling flow with one stream-wise rotation direction which will migrate in a span-wise direction. The present invention may be optimized to produce very low base drag by keeping flow attached on the leeside surface of the device. Prior vortex generators suffer from significant base drag that reduces system performance compared with the present invention. The asymmetric tetrahedral vortex generator can be designed as a reduced radar signature/low observability flow control device with faceted edges designed with angles amenable to stealth technologies.

DETAILED DESCRIPTION OF PREFERRED EMBODIMENTS

A detailed description of the invention follows with reference to the appended drawings. The components of the asymmetric tetrahedral vortex generator are as follows, with reference to FIGS. 6 and 7.

Figure 8:
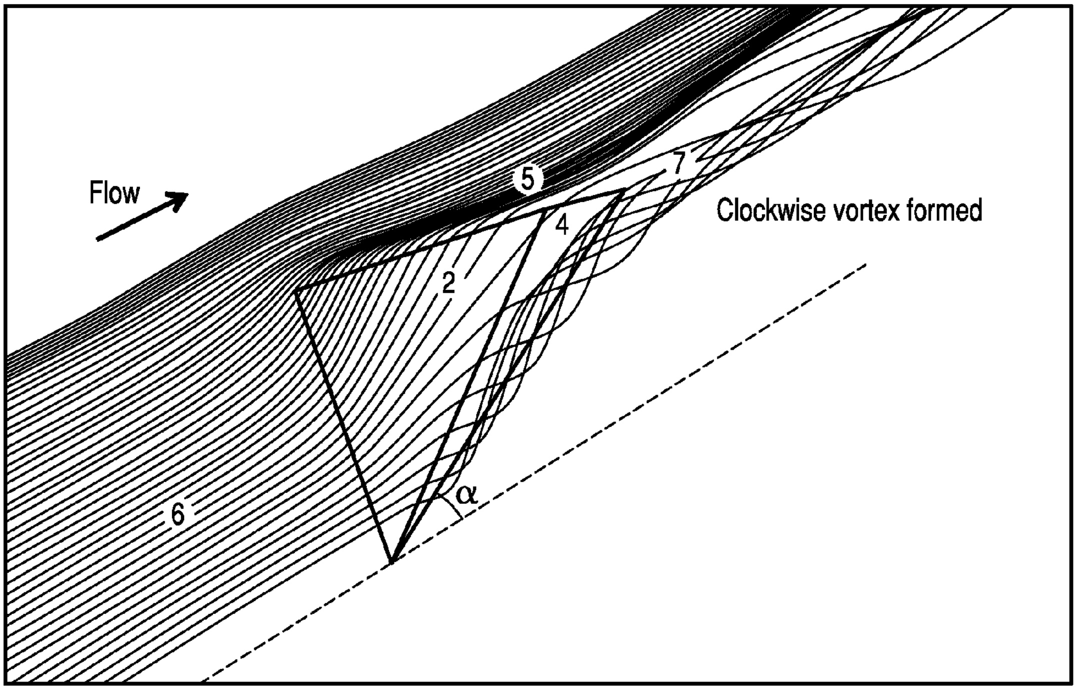
FIG. 8 shows a streamline visualization of the vortex generated by an asymmetric tetrahedral vortex generator.

1) Bottom Triangular Face (base) of Asymmetric Tetrahedral Vortex Generator.
2) Windward Triangular Face of Asymmetric Tetrahedral Vortex Generator.
3) Leeward Triangular Face of Asymmetric Tetrahedral Vortex Generator.
4) Side Triangular Face of Asymmetric Tetrahedral Vortex Generator.
5) Asymmetric Tetrahedral Vortex Generator.
6) Oncoming flow.
7) Vortex in FIG. 8 generated by asymmetric tetrahedral vortex generator.
8) Structure on which vortex generator is attached.

Figure 1:
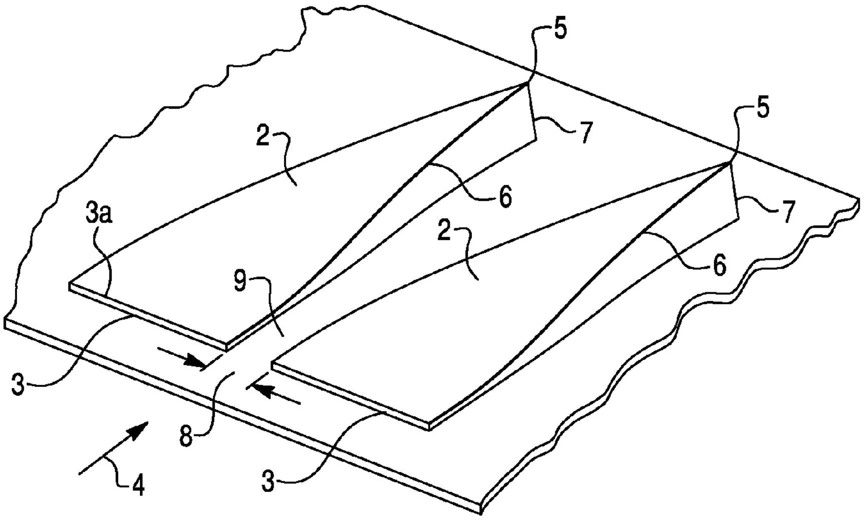
Fig. 1 Prior Art
FIGS. 1-5 show various prior art vortex generator apparati and theory.
Figure 2:
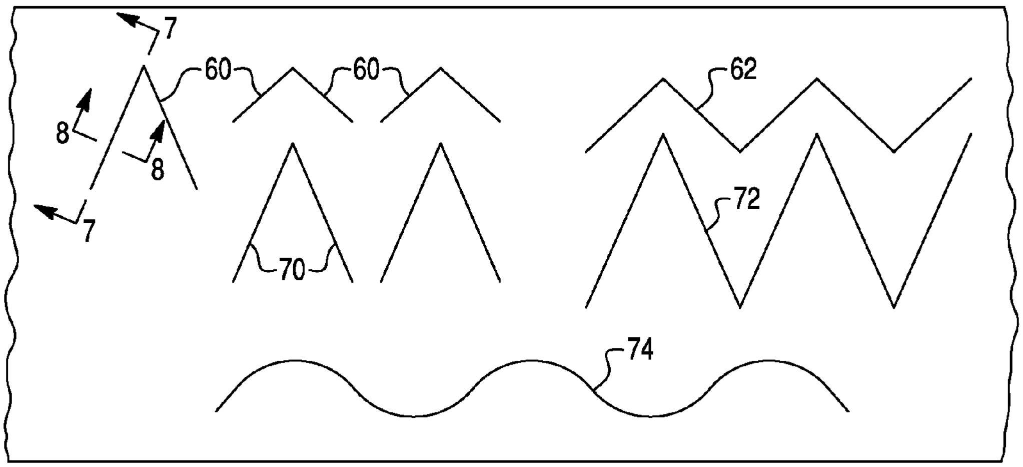
Fig. 2 Prior Art
Figure 3:
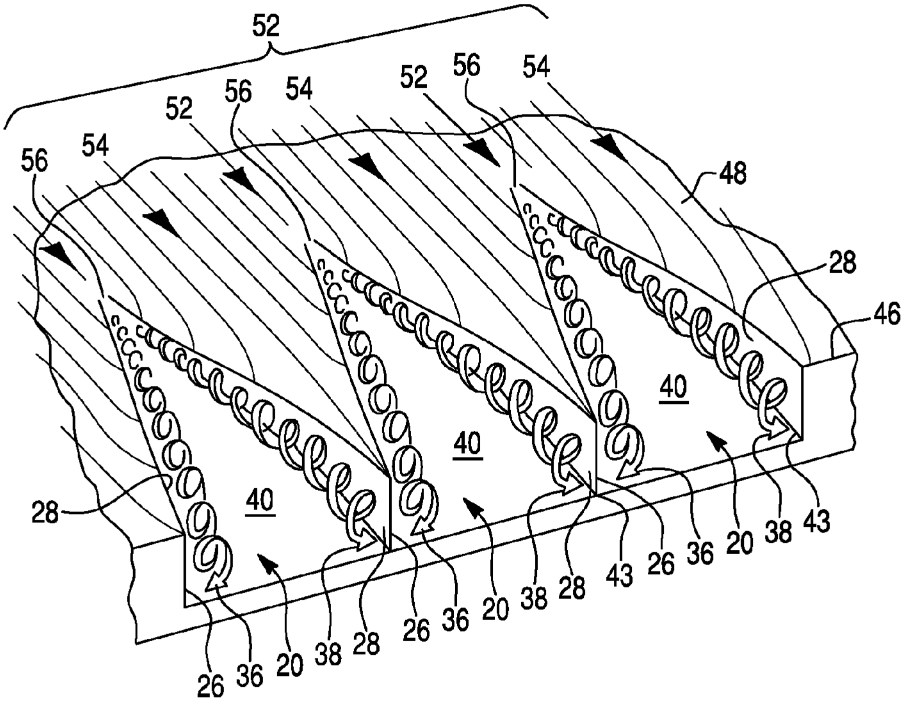
Fig. 3 Prior Art
Figure 4:
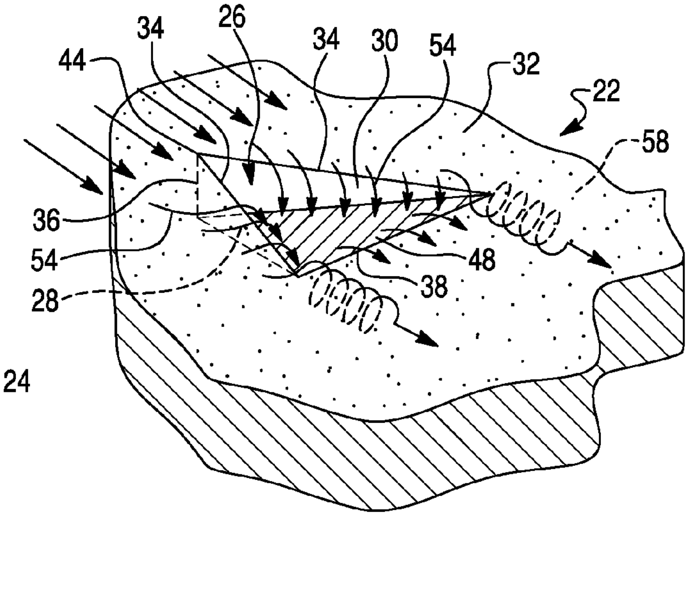
Fig. 4 Prior Art
Figure 5:
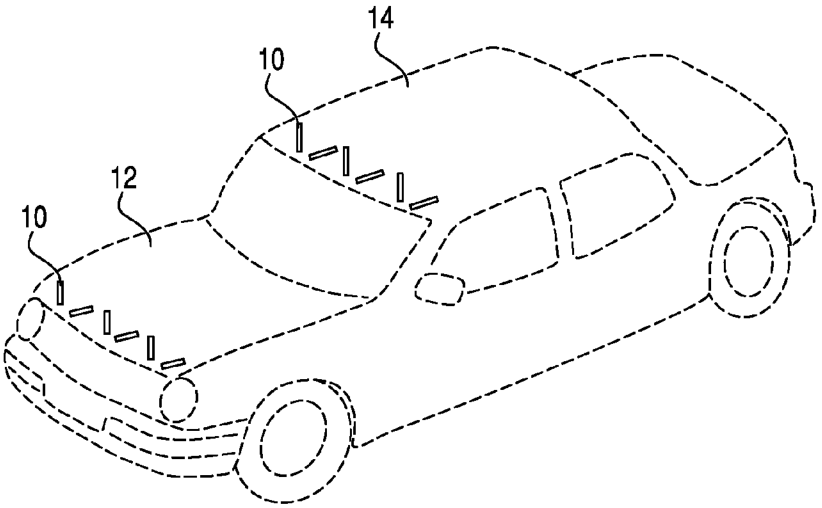
Fig. 5 Prior Art
Figure 6:
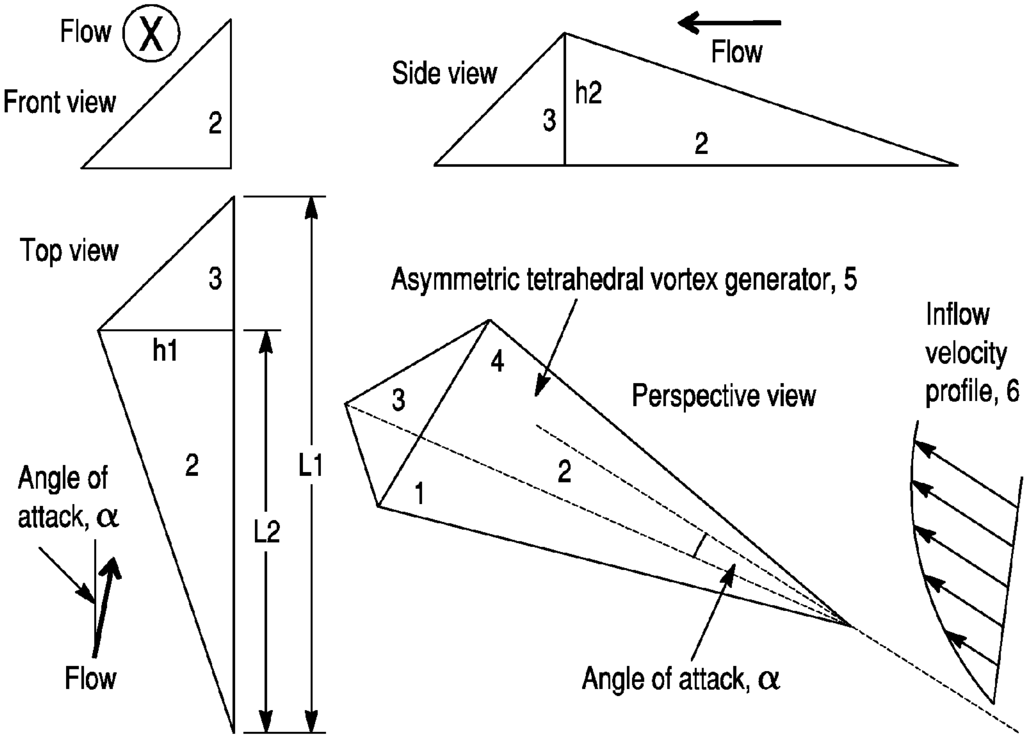
FIG. 6 shows details and views of the subject asymmetric tetrahedral vortex generators.
Figure 7:
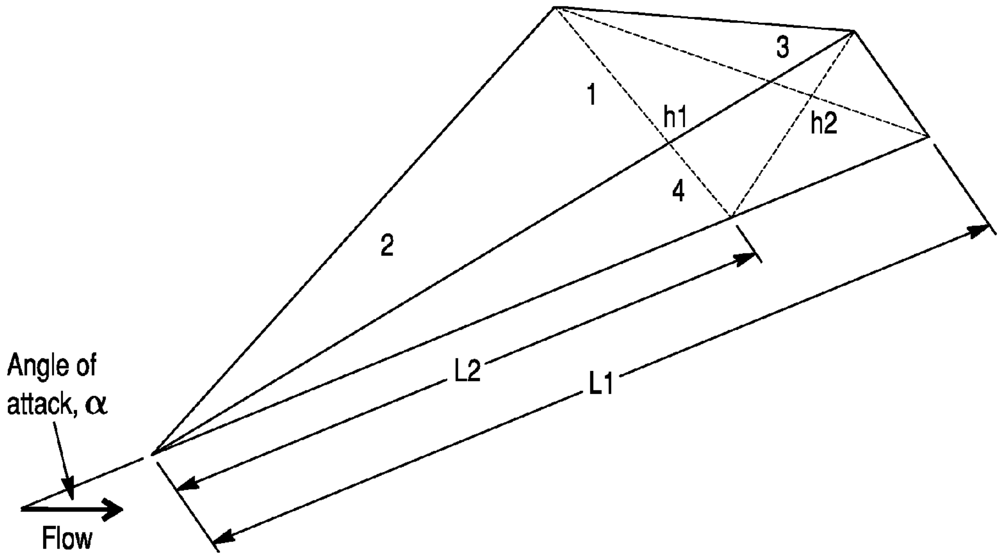
FIG. 7 is a sketch of the asymmetric tetrahedral vortex generator geometry.

The asymmetric tetrahedral vortex generator (5) shown in FIG. 6 and FIG. 7 and described herein is an asymmetric tetrahedron—a polyhedron without symmetries composed of four triangular faces, three of which meet at each vertex. The four triangular faces in the reference flow context are, respectively, the windward or upstream face or side plate (2), leeward or downstream face or side plate (3), side face or plate (4) and bottom face (1). An asymmetric tetrahedral vortex generator that is a mirror image to the one shown in FIGS. 6, 7, and 8 produces a vortex of opposite sense.

The side face (4) of the vortex generator (5) is at an angle of attack a to the oncoming flow (6). The oncoming flow (6) that approaches the vortex generator (5) of FIGS. 7 and 8 encounters the windward triangular face (2). The oncoming flow (6) stays attached to the windward surface (2) under the favorable or negative pressure gradient. The flows above the windward surface (2) and around side face (4) are at different angles and roll up to form a vortex (7) in FIG. 8 while they merge to each other.

In FIGS. 6, 7 and 8, the vortex generator creates a clockwise rotation vortex which brings high momentum flow to the flow control surface and low momentum flow away from the surface. The mechanism 6, of using a vortex generator to control separation is to energize the near-wall low speed flow through the previously described large-scale mixing process in order to delay or suppress the flow separation. The present invention produces a swirling flow with one stream-wise rotation direction which will migrate in a span-wise direction.

Figure 9:
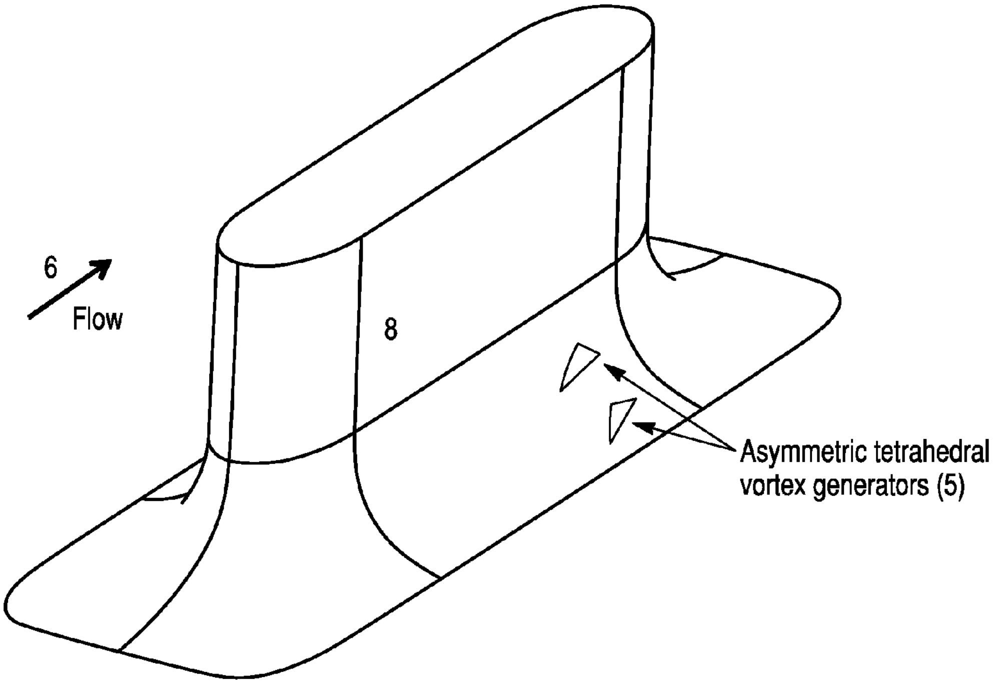
FIG. 9 shows asymmetric tetrahedral vortex generators installed at a three-dimensional vortex preventing fairing around the bottom of a bridge pier.

The low drag asymmetric tetrahedral vortex generators can be arranged in various modes based on different usages. For example, the generators may be installed in series of two or more to produce co-rotating vortices that bring high momentum fluid toward near-surface areas of three-dimensional bodies and produce a swirling flow with one stream-wise rotation direction which will migrate in a span-wise direction. In such an arrangement, they may be installed on the sides of the AUR hydraulic local scour vortex preventing three-dimensional streamlined fairing (1), as shown in FIG. 9, so that the generated vortex induces flow down toward the pier and the fairing (8). This action brings higher energy 'outer-layer' flow toward the fairing region which has thickened boundary layers due to the combination of the pier and fairing boundary layers that occur there. The benefit is the prevention of flow separation around the hydraulic structure. By the nature of the vortex generator shape, no debris is collected around the vortex generators as may occur with other vortex generator designs. As a local scour countermeasure, this shape is chosen specifically because it acts to deter build-up of debris that will be present in flood conditions. No prior work that utilizes this design has been found. Compared with the vane type vortex generator, this shape is structurally stronger and produces less drag.

The asymmetric tetrahedral vortex generators and its mirror image can be used as a pair to create counter-rotating vortices to suppress boundary layer separation. The asymmetric tetrahedral vortex generators (5) of the same shape can be used to create co-rotating vortices to suppress boundary layer separation on external flows that occur on engineered systems such as aircraft wings (8) (FIG. 10), boats, submarines, cars, buildings, and internal flow ductwork. Since the flow generated acoustic noise is related to the drag level (Simpson, 1989 and Lin, 2002), the low drag tetrahedral vortex generator will produce less noise as vortex generators with greater drag.

Asymmetric tetrahedral vortex generators can be used for supersonic flow conditions, e.g., for supersonic inlets flow control or supersonic nozzle flow control in overexpanded conditions as in take-off. The faceted surfaces can be designed as 3D ramp flows using common practice methods. This asymmetric tetrahedral vortex generator can be designed as a reduced radar signature/low observability flow control device with faceted edges designed with angles amenable to stealth technologies.

Figure 11:
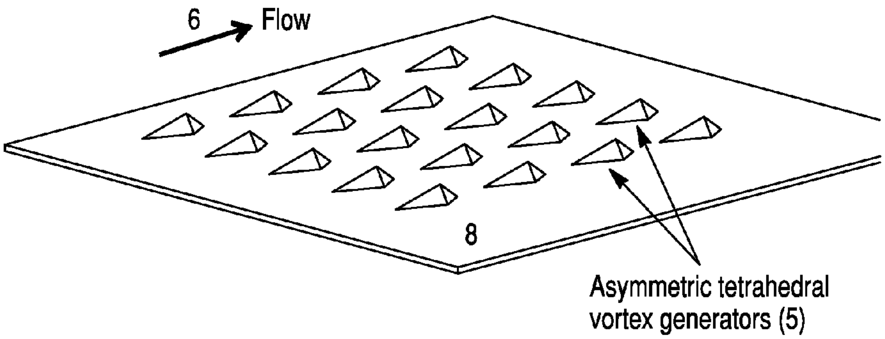
FIG. 11 is a depiction of asymmetric tetrahedral vortex generators arranged for improving heat exchange on a cold or hot plate.

Asymmetric tetrahedral vortex generators can also be positioned in the vicinity of distributed heat transfer elements, such as coolant tubes in a radiator, as low-loss guide fins to converge and accelerate near wall flow close to the heat transfer elements, while reducing the separation around the guide fin to improve overall efficiency. The asymmetric tetrahedral vortex generator devices (5) may be additionally installed on cold- or hot-plate heat exchangers (8), as shown in FIG. 11, to increase the mixing rate of the flow over the plate and improve the heat transfer while minimizing pressure drop. As a heat transfer improving device, it also acts more efficiently like a "fin" to conduct more thermal energy from the surface with more surface area.

The vortex generators in the prior art description are symmetric and generate a pair of counter-rotating vortices. In contrast, the current low drag asymmetric tetrahedral vortex generator only creates one single vortex. The geometry for the current design is relatively simple; therefore, it can be easily fabricated, cast or machined, and installed. For example, for the hydraulic usage, such as controlling local scour, it can be fabricated with fiberglass, reinforced with rebar, and cast with concrete or it can be welded from triangular steel plates.

Invention Operation and Test Results:

$$\frac{\Gamma}{U_e L} = f\left(\frac{h}{\delta}, \frac{U_T}{U_e}, \alpha, \frac{h}{L}\right).$$

As shown in the above equation, the vortex strength $\Gamma$ created by a vortex generator is a function of incoming flow speed, turbulent boundary layer wall friction velocity, vortex generator height, angle of attack, incoming boundary thickness and length of vortex generator, where $\Gamma$ is the vortex strength, $U_e$ is free-stream velocity, $U_\tau$ is the friction velocity, $\alpha$ is angle of attack, $\delta$ is inlet boundary layer thickness, h is vortex generator height, and L is vortex generator length. The $h/\delta$ and $\alpha$ are the most important factors among these variables. Original research which included a numerical computational simulation study of a series of asymmetric tetrahedral vortex generators at different heights and angles of attack shows that vortex generator strength increases with the increment of vortex generator height and angle of attack.

Figure 12:
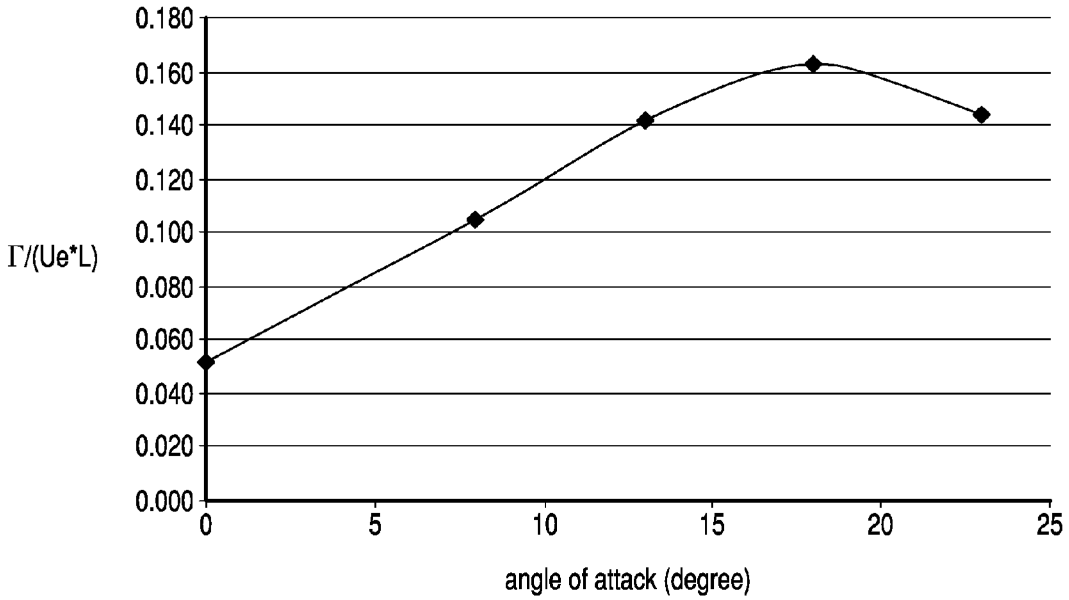
FIG. 12 shows the non-dimensional vortex strength (Γ/(Ue*L)) vs. angle of attack (degrees) for asymmetric tetrahedral vortex generator 3.

Table 1 summarizes the geometric information for three asymmetric tetrahedral vortex generators and L2, L1, h2 and h1 are defined in FIG. 7. The numerical simulation results show that design #2 generates the highest vortex strength and the vortex created by design #3 has the lowest circulation. At 18 degrees angle of attack as shown in FIG. 12, vortex generator #3 in Table 1 generates the highest vortex strength with least recirculation region on the leeside surface.

TABLE 1

Geometry definition for the tested asymmetric tetrahedral vortex generators

| | L2/L1 | h1/L1 | h2/L1 |
|---|---|---|---|
| Design 1 | 0.5 | 0.4 | 0.4 |
| Design 2 | 1 | 0.4 | 0.4 |
| Design 3 | 0.75 | 0.25 | 0.25 |

Based upon the computer simulation results, three different types of asymmetric tetrahedral vortex generators were tested experimentally in order to determine which one was the best design for controlling three-dimensional separation, producing a large stream-wise circulation, and producing the lowest drag on the vortex generator. Using a well known surface flow visualization technique (Tian et al., 2004), an oil flow and white pigment mixture was brushed on the surface of the vortex generators in order to see surface flow patterns on the vortex generators while tested in an air flow.

Figure 13:
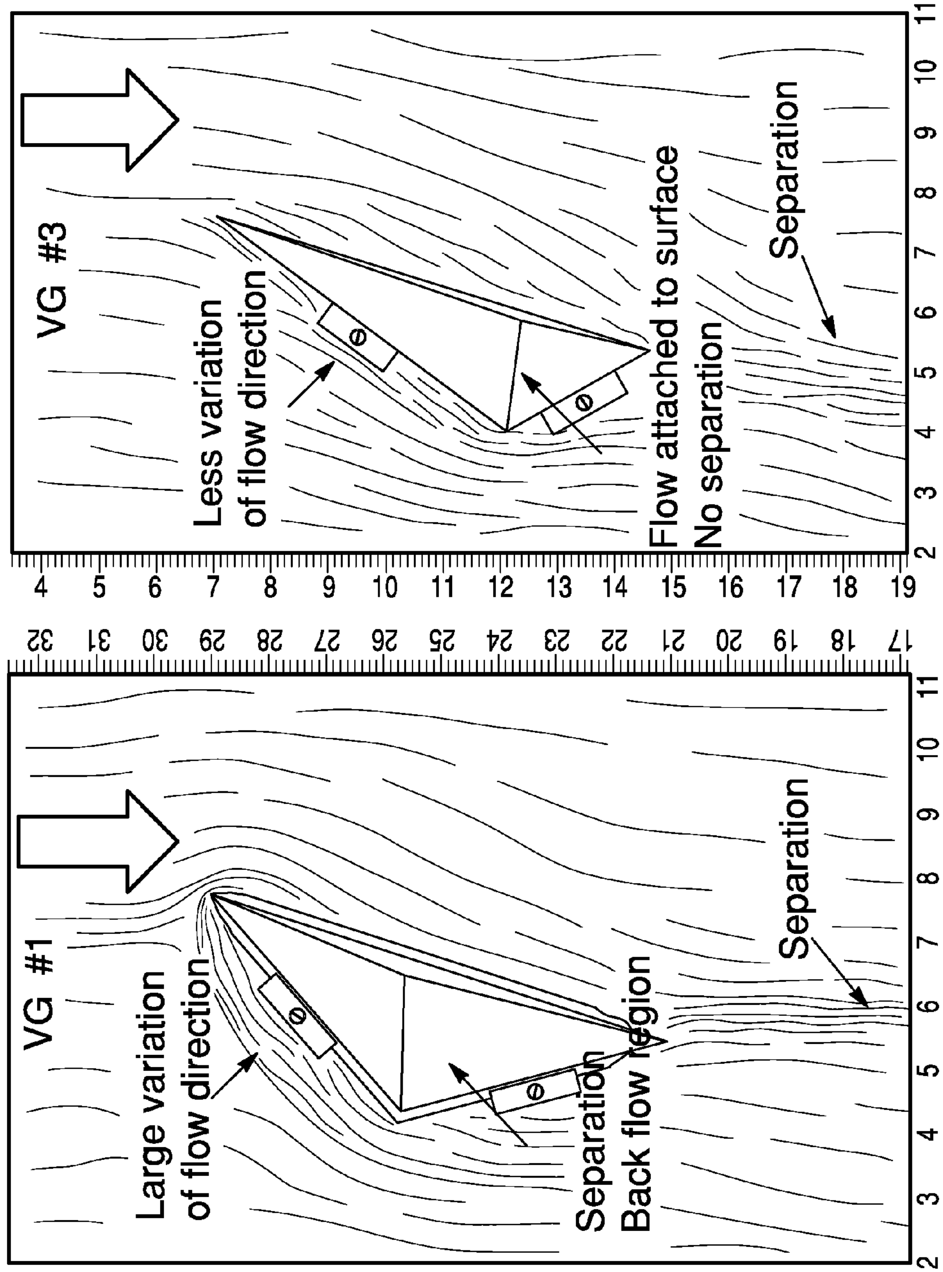
FIG. 13 is a top view of surface oil flow visualizations on the surface of the asymmetric tetrahedral vortex generator models #1 and 3. Looking downstream a counter-clockwise vortex is formed.
Figure 14:
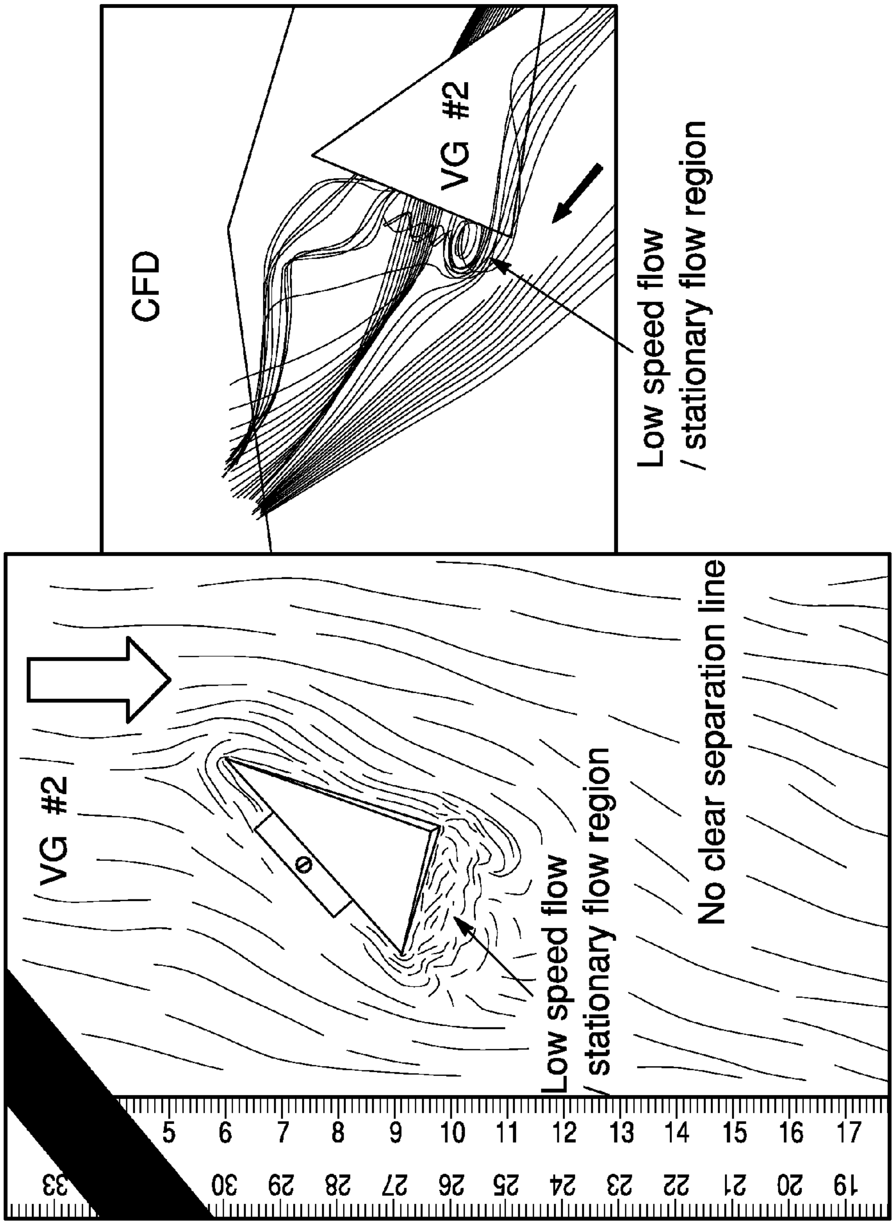
FIG. 14 is top view of surface oil flow visualization on the surface of asymmetric tetrahedral vortex generator model #2 (left) and computed streamlines from CFD. Looking downstream a counter-clockwise vortex is formed.

FIGS. 13 and 14 show the oil flow patterns on the flat plate around the vortex generators. Designs #1 and #3 clearly show white material deposits that indicate converged separation lines in the wake region of the vortex generator that are due to the strong upwash from the vortex produced by the asymmetric tetrahedral vortex generator. There is no clear separation line for design #2, which may be due to the vortex being further away from the wall or due to the greater diffusion of vortex circulation by on the leeside of vortex generator design #2. Near-wall flow in design #1 and #2 is also subjected to a large spanwise pressure gradient and has more flow direction turning.

Figure 15:
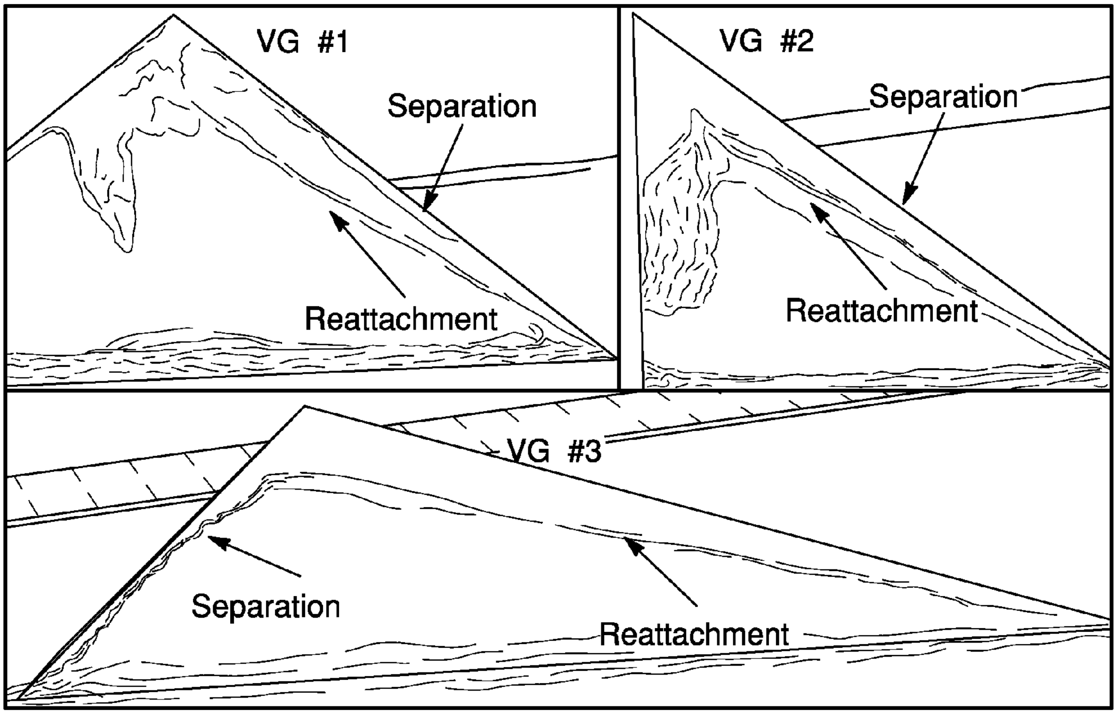
FIG. 15 is a surface oil flow visualization on the leeward side surface (4) of asymmetric tetrahedral vortex generator models. Flow from right to left. Counter-clockwise vortex formed looking downstream, as in FIGS. 13 and 14 above.
Figure 16:
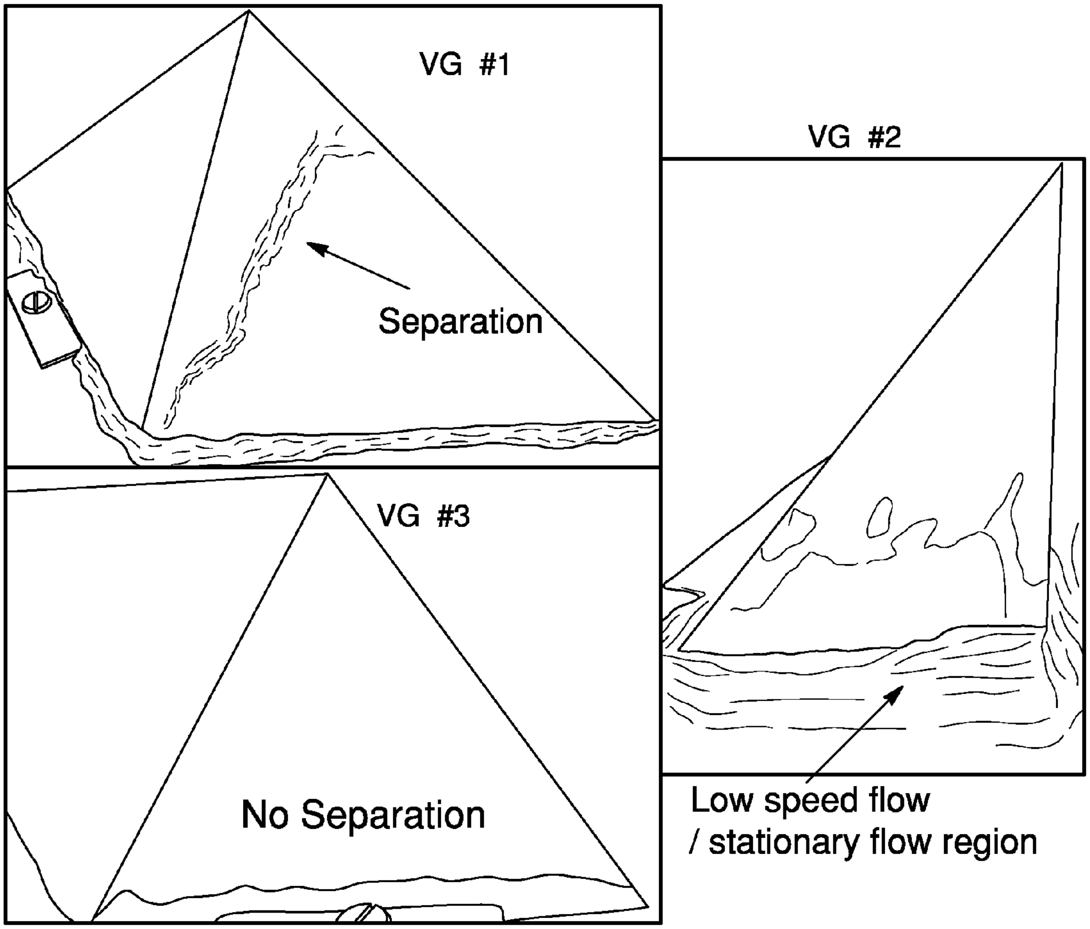
FIG. 16 is a surface oil flow visualization on the downstream leeward surface (3) of asymmetric tetrahedral vortex generator models.

For all these three cases in FIG. 15, flow separates at the edge between the windward surface (2 in FIGS. 6, 7, and 8) and side surface (4 in FIGS. 6, 7, and 8) and reattaches on the side surface (4). The flow stays attached to the windward surface (2 in FIGS. 6 and 7) under the favorable pressure gradient. Flow on the downstream leeward surface (3 in FIGS. 6 and 7) is quite different for these three different designs as shown in FIG. 16. Flow separation occurs on the leeward side of the vortex generator #1. Design #2 shows a collection of oil on the leeward side which is likely due to a separation bubble. There is no separation on the leeward surface of the design #3, which produces the lowest drag on the asymmetric tetrahedral vortex generator.

Even though the vortex generated by the asymmetric tetrahedral vortex generator #2 has the highest circulation based on the numerical simulation result, there exists a low speed recirculation region behind the device which might cause the collection of small debris and will certainly contribute to drag. Therefore, with consideration of the surface flow pattern from the oil flow visualization and numerical simulation results, design #3 is the best of the three, because the near-wall flow has the least variation of flow direction, flow is attached on the most of the asymmetric tetrahedral vortex generator surface with low drag, and the circulation in the wake is relatively high, as shown in FIG. 12.

While only a few specific designs are presented here, one can generalize the design and use requirements for various applications. First, the low drag asymmetric vortex generator should be located only in flow regions where there are zero pressure gradients or favorable or negative pressure gradients that will persist downstream of the vortex generator for at one vortex generator length. This results in a well-formed vortex without flow reversal. Secondly, the Side Triangular Face (4) of the Low Drag Asymmetric Tetrahedral Vortex Generator should be at a modest angle of attack of the order of 10 to 20 degrees, as suggested by the data of FIG. 12. The height h2 of this vortex generator in FIG. 7 should be of the order of the on-coming flow viscous boundary layer thickness. The width h1 in FIG. 7 should be of the order of the height h2. The length ratio L2/L1 as defined in FIG. 7 should be between ½ and 1 in order to prevent or reduce the extent of separation on Leeward Triangular Face (3) of the Low Drag Asymmetric Tetrahedral Vortex Generator. When multiple vortex generators are used next to one another, in order to prevent much flow interference between adjacent vortex generators, the spanwise spacing should be at least twice the maximum width of the vortex generator or twice the length of the vortex generator times the sine of the angle of attack, whichever is larger.

A competent fluid mechanics engineer using ordinary skill would understand the nomenclature herein (pressure gradients, boundary layer thickness, angle of attack) and be able to compute the flow over a body (Fairing, wing, heat transfer surface) and determine the locations where the flow has a zero or negative pressure gradient, the boundary layer thickness along the flow, and the locations and regions downstream of the vortex generators where the pressure gradient would be negative or positive. Taking this information into account, along with the principles of the invention set forth herein, sizing and placement of the respective vortex generators is enabled.

Example Manufacturing and Installation Process for the Low Drag Asymmetric Tetrahedral Vortex Generators Hydraulic Applications: Debris Deflection and Local Scour Countermeasures FIG. 9 shows design #3 low drag asymmetric tetrahedral vortex generators installed at a three-dimensional scour vortex preventing fairing around the bottom of a bridge pier that meet the general design and use requirements mentioned above. They are located in a flow region where the pressure gradients are zero or slightly favorable or negative for at least one vortex generator length downstream. This results in a well-formed vortex without flow reversal. The Side Triangular Face (4) of the design #3 Low Drag Asymmetric Tetrahedral Vortex Generator is at angle of attack of 18 degrees to the on-coming flow, resulting in near maximum vortex circulation, as shown by the data of FIG. 12. The height h2 (FIG. 7) of the vortex generators in FIG. 9 is about equal to the on-coming flow viscous boundary layer thickness and the width h1 in FIG. 7 is the same as the height h2. The length ratio L2/L1 is 0.75, as in Table 1, in order to prevent or reduce the extent of separation on Leeward Triangular Face (3) of the Low Drag Asymmetric Tetrahedral Vortex Generator. To prevent much flow interference between adjacent vortex generators, the spanwise spacing of these 2 identical vortex generators up the side of the fairing is three times the maximum width of the vortex generator.

Figure 17:
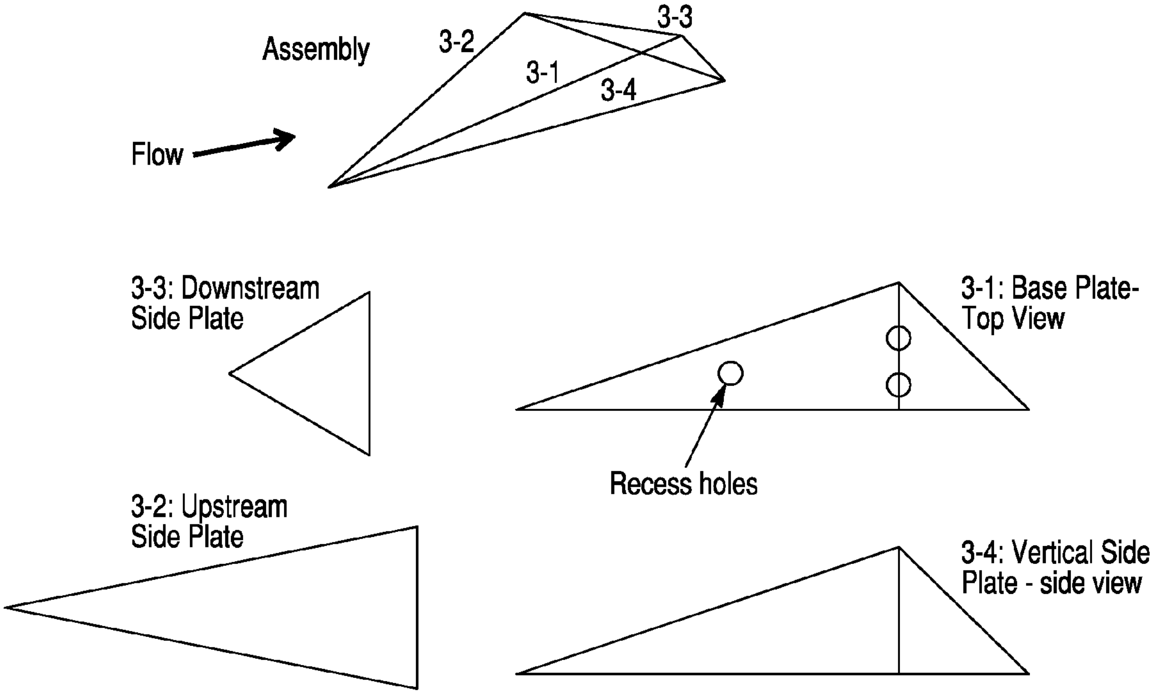
FIG. 17 is a sketch of asymmetric tetrahedral vortex generator geometry.
Figure 18:
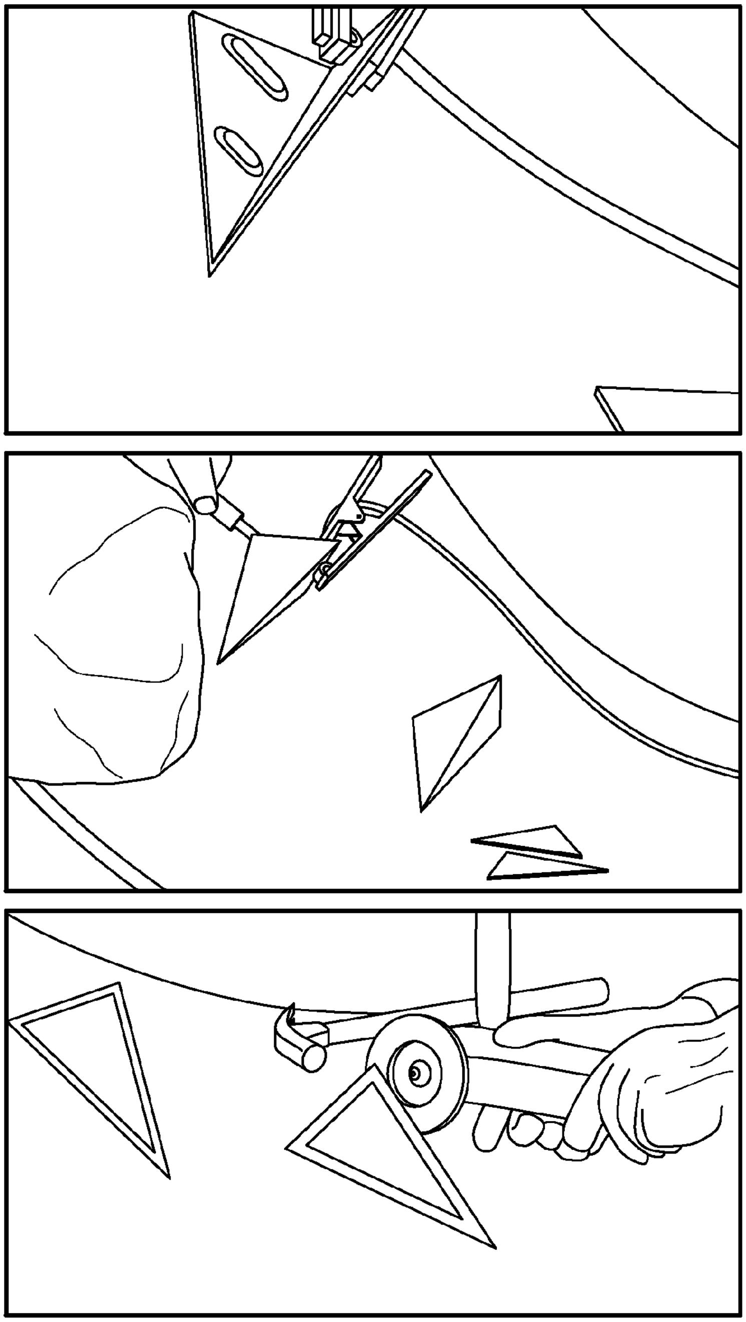
FIG. 18 shows photographs of assembly of asymmetric tetrahedral vortex generator components.

The asymmetric tetrahedral vortex generator parts are triangular shapes (FIG. 17) and made of super-corrosion-resistant stainless steel. The finished plates are in excellent quality and high durability. As shown in FIG. 18, the base plate and the vertical plate (parts #3-1 and 3-4 in FIG. 17) are first welded together, and then connected to the concrete reinforced concrete structure of the appropriate fairing segment through recess holes on the base plate. Once it's in position, two other triangular plates (parts #3-2 and 3-4) are welded to the above structure. A handheld grinder is used to grind down the weld beads on the edges to ensure sharp edges on the final products.

Drag Reduction and Separation Control

Figure 10:
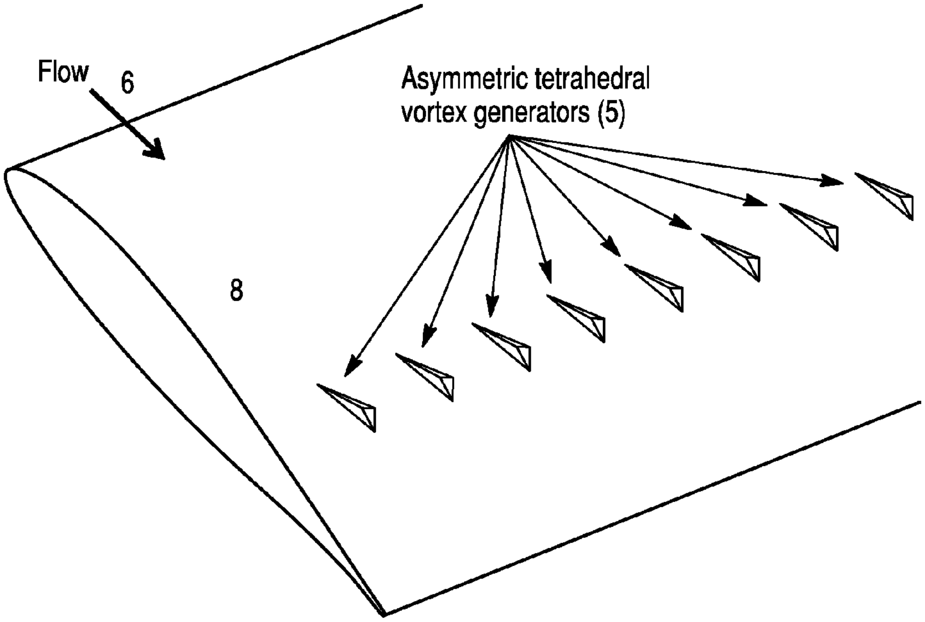
FIG. 10 is a sketch of asymmetric tetrahedral vortex generators applied to an airfoil, hydrofoil or wind turbine blade to reduce drag and suppress flow separation in subsonic or supersonic flow and associated separation generated acoustic noise.

Referring to FIG. 10, the low drag tetrahedral vortex generators for drag reduction, separation control, and reduced associated acoustic noise such as on aircraft, need to withstand large forces and large variation of operational temperatures. They can be constructed of composite materials using technologies such as used in the construction of new design commercial aircraft and molded into the required shape. They can be constructed of a lightweight metal, such as has been used for many decades in aircraft manufacturing, and the shape machined into individual panels of the aircraft or into individual tetrahedral vortex generators that can be attached by fasteners and/or adhesives. They may be solid pieces or hollow as the application may require.

Heat Exchange

The low drag tetrahedral vortex generators can also be positioned in the vicinity of distributed heat transfer elements, such as coolant tubes in a radiator, as low-loss guide fins to converge and accelerate near wall flow close to the heat transfer elements, while reducing the separation around the guide fin to improve overall efficiency. The devices may be additionally installed on cold- or hot-plate heat exchangers, as shown in FIG. 11, to increase the mixing rate of the flow over the plate and improve the heat transfer while minimizing pressure drop. As a heat transfer improving device, it also acts more efficiently like a "fin" to conduct more thermal energy from the surface with more surface area. The tetrahedral vortex generator should be a solid metal device for this application, since the maximum heat transfer to or from the plate or surface is desired. In order to maximize the heat transfer rate, the metal tetrahedral vortex generators should be attached to the heat transfer surface by welding or be machined as part of the surface when manufactured.

While the present invention has been described herein with respect to particular examples, variations will occur to those of ordinary skill in the relevant field. This invention is only limited solely by the following claims.

The invention claimed is:

1. An asymmetric tetrahedral vortex generator for placement on a surface, comprising:

an elongated tetrahedral shape joined along sharp edges and defined by four triangular sides including a base, a leeward side, a windward side, and a side face, the overall proportions of the shape characterized by the values L2, L1, h2 and h1, wherein L1 is an overall length of the side face along the base, L2 is a length to a widest dimension of the base from a windward most aspect of the shape, h2 is an overall height of said shape from the base, and h1 is a width of the base at its widest section, wherein a ratio of L2/L1 is between 0.5 to less than 1.0, h1/L1 is between 0.25 to 0.4, and h2/L1 is between 0.25 and 0.4.

2. A vortex generator as in claim 1, wherein:
said generator is mounted on a surface of a hydraulic structure fairing element for preventing local scour, providing debris deflection, and reducing drag around said structures and positioned at a height above a bed of a body of water in which said hydraulic structure is installed.

3. A vortex generator as in claim 1, wherein:
said generator is mounted on an aerodynamic body surface for reducing drag and suppressing flow separation, said generator mounted a longitudinal distance upstream of where an adverse or positive pressure gradient occurs so as to energize low speed flow in the near wall region thereby delaying flow separation and reducing drag and associated flow-generated acoustic noise.

4. A vortex generator as claim 3, wherein:
said generators are installed on said surface with faceted edges thereof and accompanying angles selected so as to reduce a radar signature of said generator and create a low observability flow control device.

5. A vortex generator as in claim 4, wherein:
said vortex generator is installed for supersonic flow over-expanded conditions, surfaces of said generator acting as 3D flow ramps to improve expansion performance of nozzles such as those on tactical aircraft during takeoff.

6. A vortex generator as in claim 1, wherein:
said generator is installed as part of an array of generators for improving heat transfer inside a heat exchanger wherein said array increase the mixing rate of a flow through said heat exchange device.

* * * * *